United States Patent [19]
Cummins

[11] Patent Number: 5,909,710
[45] Date of Patent: Jun. 8, 1999

[54] AIR-LEVITATED TRAIN

[76] Inventor: Richard D. Cummins, 33 Harmony Cir., Orchard Park, N.Y. 14127-4836

[21] Appl. No.: 08/912,245

[22] Filed: Aug. 15, 1997

[51] Int. Cl.$^6$ .................................................. B60V 1/00
[52] U.S. Cl. ............................ 104/23.2; 105/63; 105/65; 105/199.1
[58] Field of Search ................................ 104/23.1, 23.2, 104/155, 159; 105/63, 64.1, 65, 199.1, 453; 180/116, 125, 127, 128, 129

[56] References Cited

U.S. PATENT DOCUMENTS

| | | | |
|---|---|---|---|
| 3,090,327 | 5/1963 | Crowley | 104/134 |
| 3,096,728 | 7/1963 | Amann et al. | 104/134 |
| 3,238,894 | 3/1966 | Maksim, Jr. | 104/121 |
| 3,242,876 | 3/1966 | Berggren | 104/134 |
| 3,308,767 | 3/1967 | Hall | 104/134 |
| 3,500,763 | 3/1970 | Mesnager | 104/23 |
| 3,534,689 | 10/1970 | Barthalon | 104/89 |
| 3,540,378 | 11/1970 | Giraud | 104/23 |
| 3,586,382 | 6/1971 | Pitkanen | 104/23.2 |
| 3,587,471 | 6/1971 | Schneider | 104/23 FS |
| 3,602,147 | 8/1971 | Hart | 104/23.2 |
| 3,621,787 | 11/1971 | Giraud | 104/23 FS |
| 3,625,157 | 12/1971 | Hart | 104/23.2 |
| 3,675,582 | 7/1972 | Girard et al. | 104/23 R |
| 3,685,788 | 8/1972 | Bloomfield | 251/28 |
| 3,698,506 | 10/1972 | Croix-Marie | 104/23.2 |
| 3,712,406 | 1/1973 | Bertelsen | 180/122 |
| 3,744,429 | 7/1973 | Bertin | 104/23.2 |
| 3,757,699 | 9/1973 | Wirth | 104/23.2 |
| 3,788,231 | 1/1974 | Bloomfield | 104/23 FS |
| 3,799,061 | 3/1974 | Bertin | 104/23 FS |
| 3,841,223 | 10/1974 | Bertin | 104/23 FS |
| 3,845,716 | 11/1974 | Bertelsen | 104/23 FS |
| 3,952,666 | 4/1976 | Gladish | 104/23 FS |
| 4,102,272 | 7/1978 | Lehl et al. | 104/23 FS |
| 4,347,791 | 9/1982 | Mandros | 104/156 |
| 4,550,663 | 11/1985 | DeViaris | 104/23.2 |
| 4,843,969 | 7/1989 | Chaffee et al. | 104/23.2 |
| 5,359,941 | 11/1994 | Delorean | 104/23.2 |
| 5,535,963 | 7/1996 | Lehl et al. | 244/3 |
| 5,542,357 | 8/1996 | Gerhardt | 105/64.2 |
| 5,566,620 | 10/1996 | Siewert | 104/23.2 |
| 5,669,308 | 9/1997 | Gerhardt | 104/23.2 |

*Primary Examiner*—Mark T. Le
*Attorney, Agent, or Firm*—Simpson, Simpson & Snyder

[57] ABSTRACT

A vehicle system for high-speed passenger transport between metropolitan centers comprises a guideway having a pair of parallel guideway tubes; a plurality of carriages levitated and propelled by pressurized air stored within one or both tubes; and a passenger car connected to ride atop the carriages and tilt relative thereto. The passenger car and carriages cooperate to define lateral air cushion zones under the floor of the passenger car for supporting and tilting the passenger car by air pressure. The carriages have pluralities of lift cells partially surrounding each guideway tube, with active peripheral skirts for minimizing air leakage. Pressurized air stored within the guideway is used to supply the lift cells and cushion zones, and also to propel and brake the carriages. Ram air is collected during vehicle motion to help supply the lift cells and cushion zones.

22 Claims, 7 Drawing Sheets

AIR-LEVITATED TRAIN

BACKGROUND

A. Field of the Invention

The present invention relates generally to transportation vehicles or trains which travel along a guideway or track, and more particularly to an air levitated train of novel construction designed for high speed travel between metropolitan centers, steep banking around curves, and very low levitation air leakage.

B. Description of the Prior Art

A variety of guided vehicle systems have heretofore been proposed, often with the function of high-speed travel over long distances foremost in mind. In these various systems, it is known to utilize pressurized air for levitating the vehicle above a guideway to avoid friction between the vehicle and guideway, and for propelling the vehicle along the guideway.

Examples of air-levitated vehicles may be found in the following U.S. patent documents:

U.S. Pat. No. 3,090,327 to Crowley is directed to an air-levitated vehicle including a passenger car and a hollow, downwardly open pressure chamber beneath the car. A lift engine located on top of the car communicates with the pressure chamber via a vertical duct through the center of the car to provide pressurized air within the pressure chamber to lift the car slightly above a concrete track. The track defines a central peak formed by a pair of inclined lateral surfaces, with fore and aft walls of the pressure chamber forming a complementary configuration. In a modified embodiment of this vehicle designed for emergency stopping at high speeds, the pressure chamber is provided with an inner wall formed of brake lining material in complementary configuration to the track and having holes therethrough for escape of pressurized gas to lift the vehicle, and the inclined surfaces of the track are covered with stainless steel facings.

A high-speed rail system is described in U.S. Pat. No. 3,238,894 to Maksim and includes a vehicle suspended between oppositely disposed parallel guideways. Each guideway includes a pair of converging air bearing surfaces connected by a central transverse surface, and the vehicle is provided with a plurality of protruding fins complementary to the air bearing surfaces. The fins are configured to entrap a thin wedge-shaped film of air forcing against an associated air bearing surface of the guideway to support the vehicle without mechanical contact with the guideway when the vehicle is moving at a high rate of speed. The vehicle further includes wheels arranged to to engage longitudinal grooves in the central transverse surface for travel at lower speeds. Propulsion is by reaction engine or propeller.

Another air-supported vehicle system is disclosed in U.S. Pat. No. 3,308,767 to Hall, and is designed for installation over existing railways. This system includes parallel fluid bearing rails of tubular construction on the outside of the existing rails for receiving strut members connected to opposite sides of a train car, with pressurized air being supplied to the fluid bearing rails by an on-board compressor to provide a film of air between the strut member and bearing wall.

The vehicle system of U.S. Pat. No. 3,534,689 includes a passenger car suspended from an overhead tubular track for rotation about the longitudinal axis of the track, wherein lifting and centering of a passenger car mounting block about the track tube is achieved by diverting air from cells surrounding the underside of the tube to create subatmospheric pressure therein. A motor-driven propeller is employed as propulsion means.

U.S. Pat. No. 3,799,061, while not specifically directed to high-speed transport, nevertheless discloses a vehicle system comprising an overhead tubular track, and a vehicle suspended from the track by a pair of roof-mounted curved members bearing on the track tube by way of pressurized air cushions supplied by on-board air compressors and permitting rotation of the vehicle about the longitudinal axis of the track tube. Propulsion is conventional in nature, i.e. by linear electric motor.

U.S. Pat. No. 3,952,666, in particular at FIG. 3, teaches a vehicle having a pair of lateral curved shoe members received within parallel slotted guideway tubes supplied with pressurized air from a guideway supply pipe, wherein the vehicle is confined to tilt through curves only to the extent the guideway tubes are banked. The guideway tubes include a concave trough under the respective shoe having nozzles for creating a wedge of pressurized air under the shoe. Propulsion by a "linear pneumatic motor", or by conventional on-board jet engines, is contemplated.

Examples of pneumatic propulsion systems are also found in the prior art. Notable teachings include that of U.S. Pat. No. 3,242,876 to Berggren, and that of U.S. Pat. No. 5,542,357.

SUMMARY OF THE INVENTION

The primary object of the present invention is to provide an air-levitated vehicle system for high-speed travel between metropolitan centers which satisfies the following design criteria: very low power loss due to levitation air leakage; ample compliance to normal irregularities in guideway alignment; steep tilting of the passenger car beyond practical limits for banking of the guideway alone; mechanical control of both vertical height and tilting of the passenger car in addition to air assisted levitation and tilting; guideway storage of pressurized air for both propulsion and levitation; tendency of the guideway not to naturally collect snow and debris, nor to require exclusive land usage such as for embankments or road crossings; minimal environmental disturbance; quiet and efficient air jet propulsion; and an acceptable braking distance.

In view of the above design criteria, a vehicle system in accordance with a preferred embodiment of the present invention includes at least one passenger car mounted atop a plurality of carriages adapted for travel along a guideway, wherein each passenger car is supported and tilted by pressurized air trapped beneath the the floor of the passenger car, and the carriages are levitated just above the guideway by pressurized air within lift cells opening toward the guideway.

In the preferred embodiment, the guideway comprises a pair of parallel guideway tubes, at least one of which contains pressurized air releasable through a plurality of upwardly directed lift valves provided along the guideway tube in the vicinity of each train station, which air is received by a collector duct running the length of the carriage directly above. This air is directed to lift cells partially surrounding the circumference of each guideway tube, and also diverted to help support the passenger car, while the vehicle is traveling at very low speed or is stationary, for example when the vehicle is in the vicinity of a station or terminal. Ram air intakes are provided in the passenger car for collecting air while the passenger car is in high-speed motion between stations, and jet caps in the carriages collect propulsion and braking exhaust air at intermediate speeds.

The collected ram air and propulsion exhaust air is fed to the lift cells as needed to support the carriages, and to support and tilt the passenger car.

The lift cells are surrounded by adjustable height skirts for trapping levitation air. The bottom edge of each skirt is maintained in close proximity to the surface of an associated guideway tube by connection with a plurality of aerodynamically designed shoes spring biased toward the guideway tube surface but separated slightly therefrom by a viscous layer of air. Consequently, air leakage from the lift cells is minimized.

Each passenger car is linked to a series of underlying carriages by a plurality of shock-absorbing servo-actuators having a bottom end hingedly connected to a carriage and a top end fixed to the floor of the passenger car, whereby tilting of the passenger car relative to the underlying carriages may be achieved for curves. The sidewalls of the passenger car extend below the floor level and terminate at inwardly disposed flexible seals designed to slidably engage smoothly contoured side surfaces of the underlying carriages, and bulkhead means are provided at the front and rear ends of each carriage, such that the volume between the carriage and the passenger car floor is substantially fluid-sealed. A central partition extending the length of each carriage divides this sealed volume into left and right cushion zones, with tilting being effected by establishing a pressure differential between the left and right cushion zones and assisted by a mechanical tilt actuator.

A plurality of propulsion stations are provided at regular intervals along the guideway between the guideway tubes, and are fed with pressurized air via cross-tubes communicating with the guideway tubes. The propulsion stations include a solenoid controlled peel valve system for selectively discharging air jets through a first plurality of thrust nozzles pointing in one guideway direction or through a second plurality of thrust nozzles pointing in an opposite guideway direction for imparting thrust to the carriages and passenger cars connected thereto. Each carriage includes an inverted channel extending the length thereof and having first group of directionally biased impulse vanes arranged to receive impulse energy from air jets delivered by the first plurality of thrust nozzles, and a second group of oppositely biased impulse vanes arranged to receive impulse energy from air jets delivered by the second plurality of thrust nozzles. In this way, bi-directional thrust is possible using stationary thrust nozzles for efficient jet energy transfer. The carriages are preferably equipped with automatically actuated jet caps which may be selectively lowered into position adjacent the impulse vanes for collecting propulsion jet air and routing it through a check valve to the cell supply ducts, this feature being primarily for travel at intermediate speeds when ram air pressure may be insufficient for vehicle support.

BRIEF DESCRIPTION OF THE DRAWINGS

The nature and mode of operation of the present invention will now be more fully described in the following detailed description of the preferred embodiments taken with the accompanying drawing figures, in which.

DETAILED DESCRIPTION OF THE PREFERRED EMBODIMENTS

Figure 1:
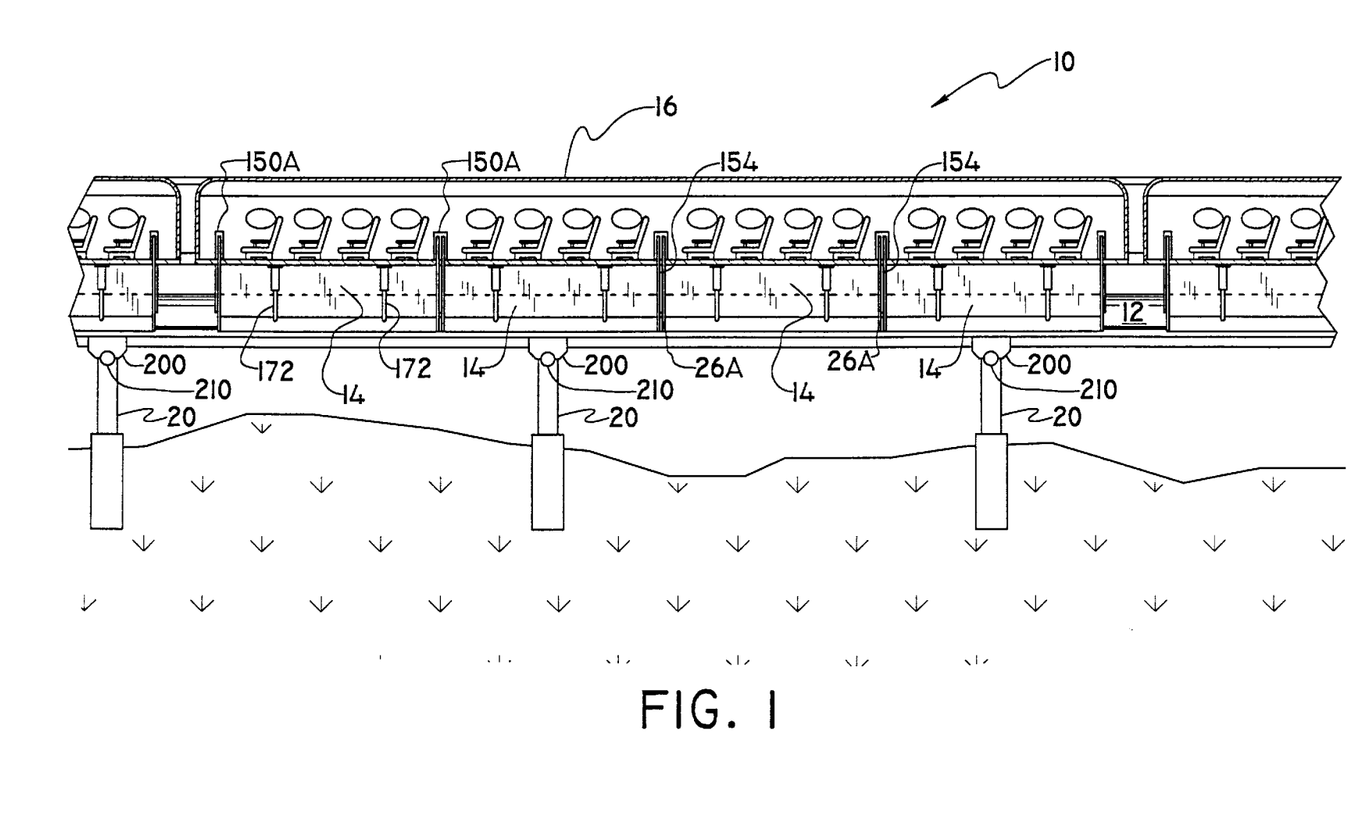
FIG. 1 is side view in cross-section showing a vehicle system formed in accordance with a preferred embodiment of the present invention.
Figure 2:
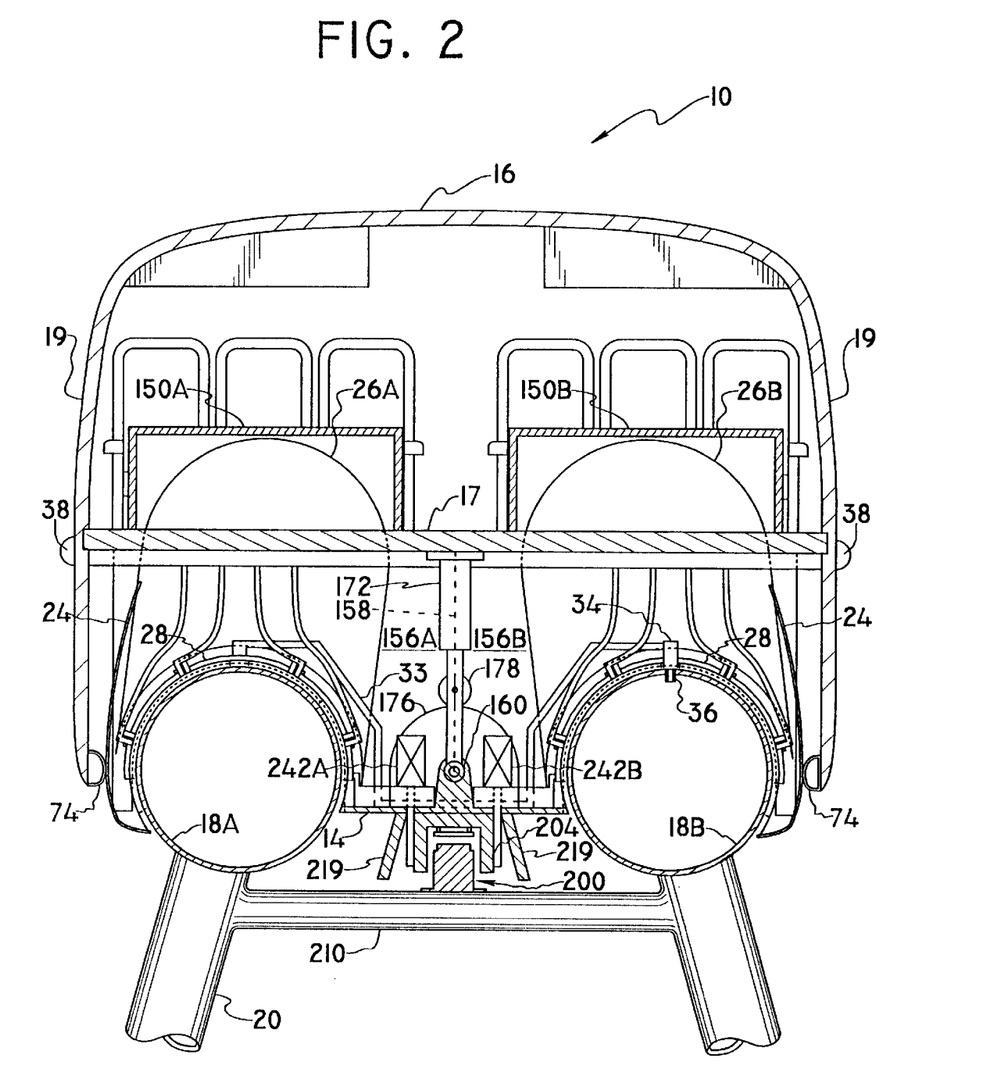
FIG. 2 is a front sectional view thereof taken generally along the line 2—2 in FIG. 1.

Reference is made initially to FIGS. 1 and 2 of the drawings, wherein a passenger vehicle system 10 according to a preferred embodiment of the present invention is shown as generally comprising a track or guideway 12, a plurality of carriages 14 supported for travel along guideway 12, and a passenger car 16 connected atop carriages 14 for travel therewith. While the present description is limited to a single passenger car for sake of simplicity, it will be appreciated that several passenger cars 16 and associated carriages 14 may be linked together in end-to-end arrangement to form a train as is common in the art.

Guideway 12 comprises a pair of hollow cylindrical tubes 18A,18B extending in parallel relationship and supported above the ground at regularly spaced intervals by support members 20. At least one, and possibly both, of tubes 18A,18B stores fluid, preferably pressurized air supplied by pumping stations (not shown) located at points along the guideway, for use in supporting and propelling carriages 14 and passenger cars 16 in an environmentally clean, quiet, and safe manner as will be described in greater detail below. A preferred storage pressure range for air within guideway tube 18A and/or 18B is 15–45 p.s.i.

Guideway tubes 18A,18B may be of a lightweight construction, such as sheet metal, so as to minimize the costs of guideway elevation and bridge structures. Because fairly accurate location of tubes 18A,18B*b* relative to each other both laterally and vertically is desirable for optimal performance of the present vehicle system, support members 20 should be sufficiently rigid to maintain the locational integrity of tubes 18A,18B under high wind conditions and the stresses due to pressurized expansion joints between adjacent segments guideway 12. Support members 20 are preferably constructed of tubular frame members, including a cross-tube 210, for communicating pressurized air from tube 18A and/or tube 18B to a propulsion system used in the present invention, as specified hereinafter. Along certain segments of guideway 12, it may be necessary to provide a ground-poured foundation to rigidly support tubes 18A,18B, depending upon the particular terrain involved. Where guideway 12 extends in a straight line, tubes 18A,18B are normally level. Guideway 12 is banked through curved segments thereof by elevating an outer one of tubes 18A, 18B up to 22½ degrees relative to an inner one of tubes 18A,18B as may be seen in FIG. 3. Since passenger car 16 is connected to carriages 14 to pivot up to approximately 22½ degrees relative to the carriages, pursuant to description presented below, the total banking angle of the passenger car may reach is approximately 45 degrees. This exceeds the practical limit of 22½ degrees for guideway tilting alone, thereby making the vehicle system of the present invention particularly suitable for negotiating populated and congested areas where sharper radius curves are required. The tubular shape of guideway 12 is advantageous in that the guideway is not prone to collecting ice, snow, and debris.

Figure 3:
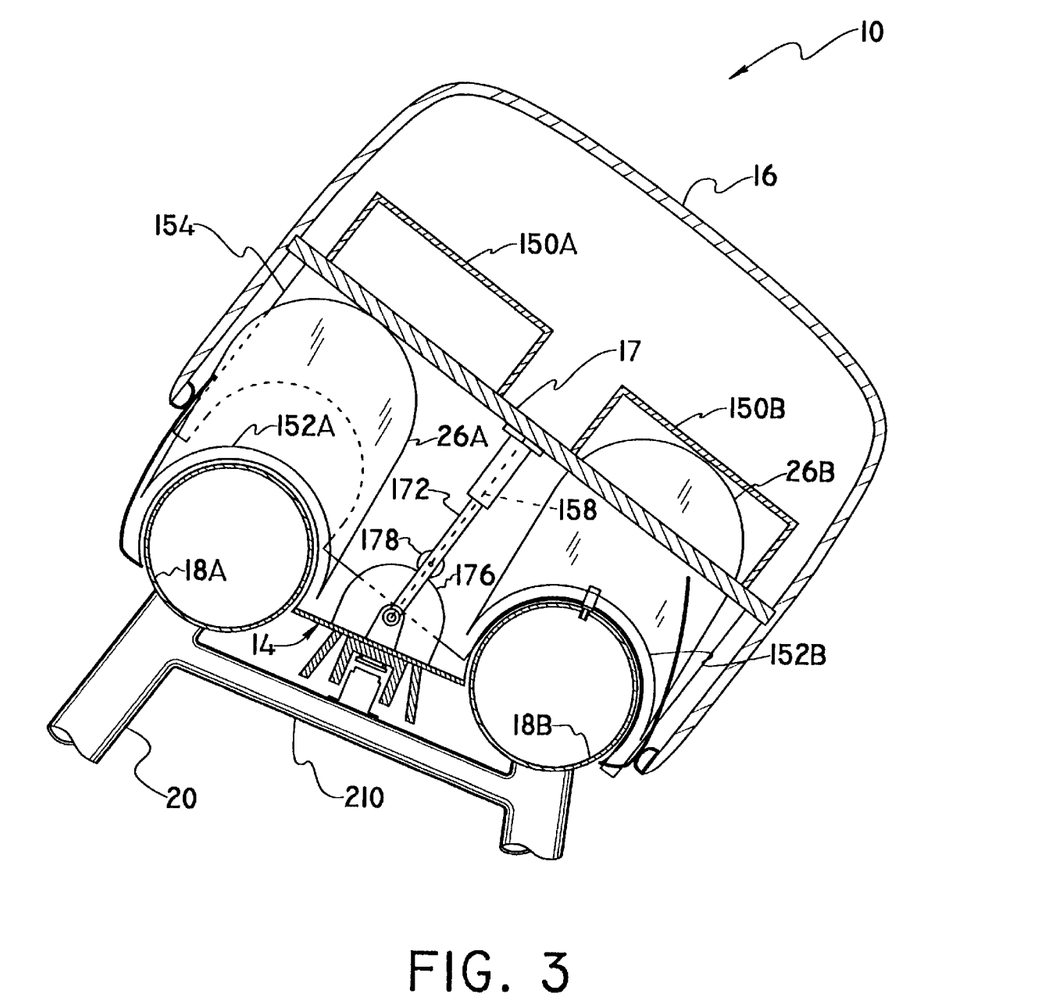
FIG. 3 is a view similar to that of FIG. 2, however showing a guideway and a passenger car of the present invention in a tilted orientation for negotiating curves.
Figure 4:
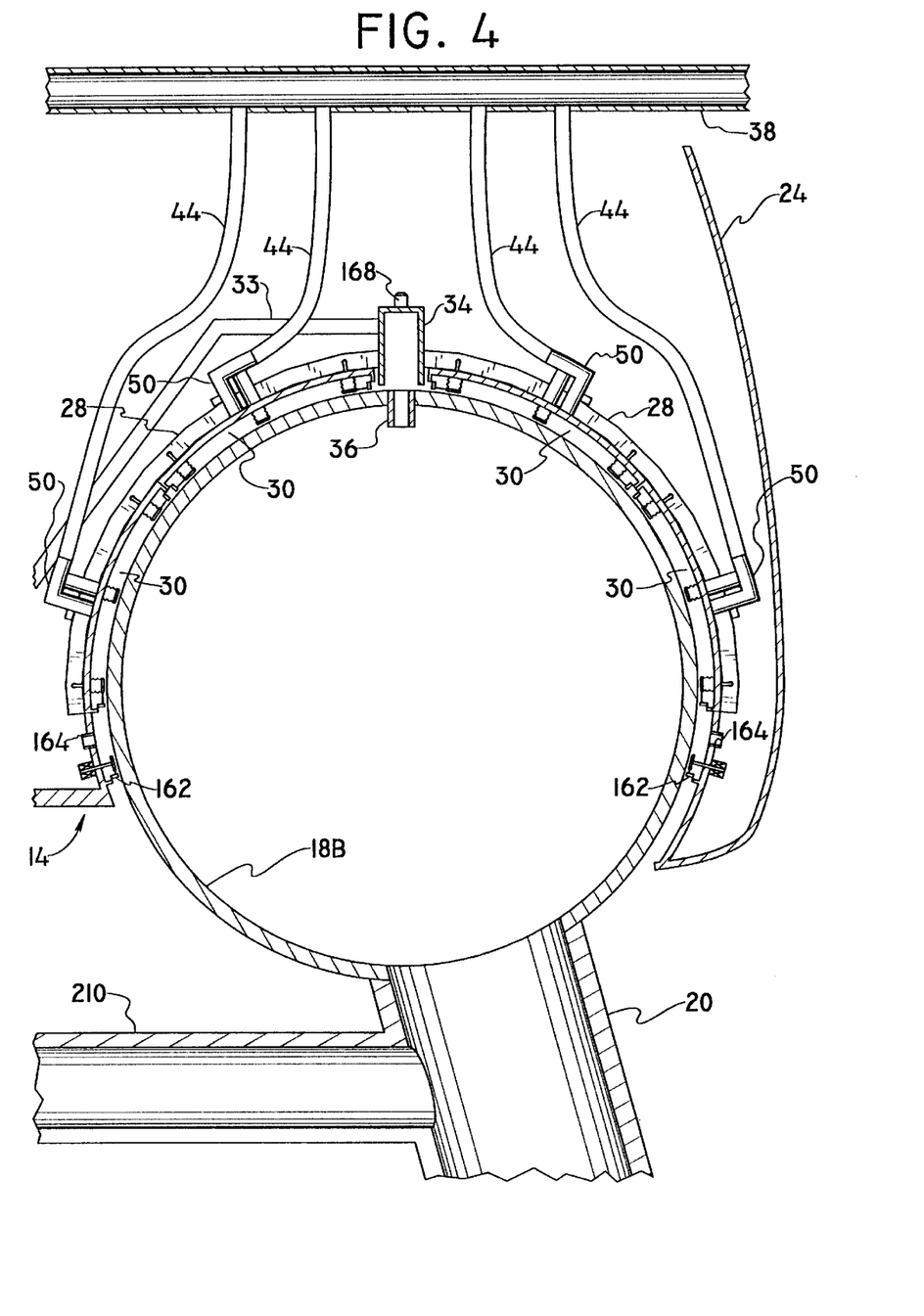
FIG. 4 is an enlarged sectional view showing a plurality of carriage lift cells partially surrounding a guideway tube of the present invention.

Referring primarily to FIGS. 2–4, carriages 14 are designed to travel along guideway tubes 18A,18B on a thin cushion of air, preferably at a pressure of about ½ psig, trapped within a plurality of lift cells 30 partially surrounding guideway tubes 18A,18B through an angle of about 180 degrees. Carriages 14 are further designed to cooperate with an overhead passenger car 16 to support the passenger car on cushions of air under a floor 17 of the passenger car at a pressure of approximately ¼ psig. Since there are no concentrated loads, such as those which exist in wheeled vehicles and aircraft, passenger cars 16, carriages 14, and guideway 12 may be made of lightweight materials. The avoidance of heavy beams and structural members in guideway construction is expected to result in significant cost savings as compared with competitive vehicle systems which rely on such items. The weight of passenger car 16 is supported over nearly the entire area of its floor 17, and the weight of each carriage 14 is supported over the surface area of cells 30 partially surrounding guideway tubes 18A,18B. Because of the flexible construction of lift cells 30, carriages 14 will maintain a stable average clearance, preferably on the order of one-half inch to four inches, between the cell 30 and the outer surface of an opposed guideway tube 18A or 18B, regardless of any irregularities in the guideway surface. This clearance is referred to as the "lift cell height" hereinafter.

The carriages 14 include smoothly and inwardly contoured side surfaces 24, cell supply ducts 28 following overtop cells 30, and curtains or skirts 32 defining the periphery of lift cells 30. Each carriage 14 further includes pairs of left and right upstanding bulkhead plates 26A,26B located at the front and rear ends of the carriage. A collector duct 34 extending the length of carriage 14 is positioned centrally above one or both of guideway tubes 18A,18B, depending upon whether pressurized air is stored in the associated guideway tube.

Figures 5, 6:
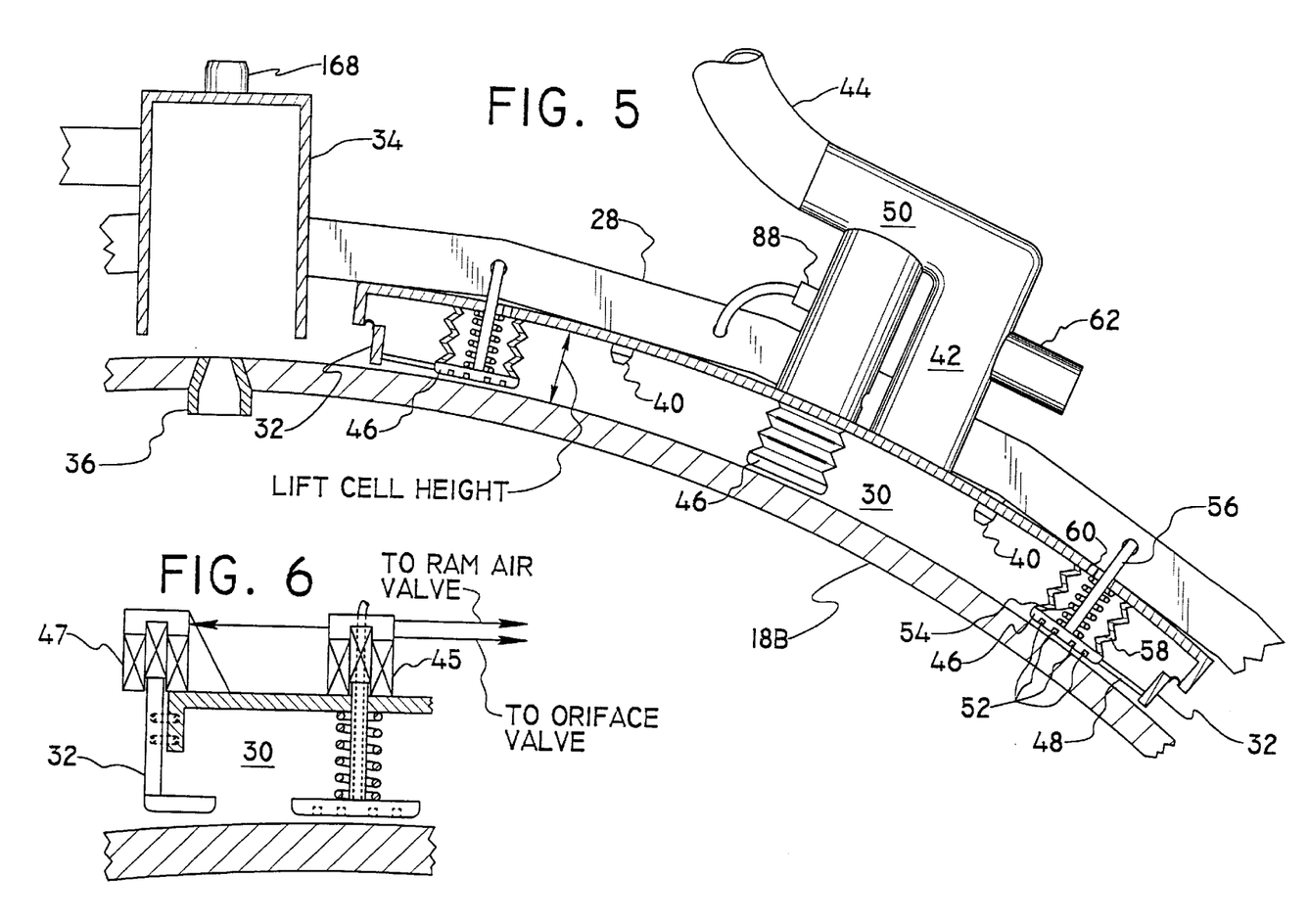
FIG. 5 is sectional view, enlarged further relative to FIG. 4, showing a single lift cell of the present invention in detail.
FIG. 6 is a partial sectional view showing an alternative embodiment of the present invention wherein lift cell pressure and lift cell skirt position servo-controlled.

Levitation of carriages 14 above guideway tubes 18A,18B is now described in greater detail in conjunction with FIGS. 4–6. In the specific embodiment described herein, levitation air comes to cells 30 from two sources: pressurized air stored within guideway tube 18B, and "ram" air introduced through intakes 38 provided at regular intervals along the length of passenger car 16 through sidewalls 19 below the level of floor 17. However, it will be understood by those skilled in the art that guideway tube 18A may also store pressurized air used for levitation of carriages 14.

Guideway tube 18B includes a series of lift valves 36 at spaced intervals along the guideway tube in the vicinity of each train station. Lift valves 36 are aligned opposite carriage collector duct 34 to direct air vertically upward, whereby air released from guideway tube 18B through lift valves 36 is received by collector duct 34 and may be used to support carriages 14 and passenger car 16 while they are stopped at a station. Lift valves 36 are normally closed to protect the valves from exposure to the elements, i.e. rain and snow, and must be signaled to open by control means located in the approaching train so that debris and ice not previously cleared by a train or by other means will be forced clear by a jet of pressurized air just prior to arrival of the train. Once the train has departed, the lift valves 36 are returned to their closed condition by the on-board controller.

The pressurized air released by lift valves 36 flows into collector duct 34, which communicates with lift cells 30 via cell supply ducts 28 and constant-flow orifice valves 40. Crossover ducts 33 carry levitation air from collector duct 34 to the supply ducts 28 which supply lift cells 30 associated with guideway tube 18A. If both guideway tubes 18A,18B are used to store pressurized air, guideway tube 18A is simply provided with levitation valves 36 and carriage 14 is provided with an additional collector duct above the levitation valves in tube 18A, similar to the arrangement described for tube 18B, thereby eliminating the need for crossover ducts 33. Ram air gathered by intakes 38 during motion of passenger car 16 is directed to lift cells 30 via intake ducts 44 leading to respective ram air valves 50 and auxiliary vessels 42 mounted on a central portion of each lift cell for communication therewith.

As previously mentioned, lift cells 30 are surrounded at their periphery by skirts 32 to trap levitation air within the confines of the lift cell. Because carriage 14 is continuously subjected to different loading conditions due in part to passenger movement within passenger car 16 and the changing (non-linear) path of guideway 12, the carriage levitation system of the present invention is responsive to the changing loading conditions experienced at each lift cell 30 to provide positional stability for carriage 14 as it travels along the guideway. Furthermore, in accordance with the present invention, cell skirts 32 are "active" in that relative movement occurs between the skirts and carriage 14 to maintain a very small air gap between the edge of the skirt and the guideway tube 18A or 18B, thereby greatly minimizing power loss due to air leakage from the lift cells. The means for detecting loading changes at a given lift cell 30 and instantaneously adjusting air pressure within that lift cell may be mechanical or servo-mechanical in nature.

In a completely mechanical embodiment shown best in FIG. 5, skirts 32 form the sides of a generally rectangular boundary about lift cell 30 and are connected by bridge members 48 to a plurality lightweight, aerodynamically designed shoes 46 located near each of the four corners of the lift cell 30 entirely within the rectangular confines of skirts 32. Shoes 46 are hollow circular disks having an upturned circumferential edge to direct air flow beneath the shoe during travel, and include an area array of downwardly directed air jets 52 through the lower surface of shoe 46 which are fed by flexible hoses 56 running from cell supply duct 28, whereby a constant viscous layer of air approximately ⅛ inch thick is maintained between shoe 46 and the outer surface of an opposing guideway tube 18A,18B, and a similarly small air gap is maintained between the bottom of curtains 32 and the surface of the guideway tube. Each shoe 46 is biased toward the associated guideway tube 18A,18B by a load spring 54 extending between the underside of lift cell 30 and the top of the shoe. A lightweight, sealed bellows 58 surrounds shoe 46, and an exhaust vent 60 is provided through the top of lift cell 30. The mass of shoe 46 and movable skirt 32 is minimized so that the skirt will accelerate rapidly enough to follow whatever surface irregularities exist in the opposing guideway tube 18B without making physical contact with the guideway tube. The spring constant of the load spring 54 is chosen to be inversely proportional to the lift cell height, such that as the carriage is forced nearer to the guideway tube due to increased local loading, the spring force increases. Since the air flow rate to lift cell 30 through orifice valves 40 is substantially constant, as will occur where the air within supply duct 28 is at an appreciably higher pressure than the air within lift cell 30, increasing back pressure will develop in lift cell 30 to force the lift cell away from guideway tube 18A,18B in response to the increased local loading. Increased back pressure also develops under shoe 46, however it is maintained in close proximity to the outer surface of guideway tube 18A,18B by the increased spring force exerted by load spring 54, thereby keeping the air gap between the bottom of skirt 32 and the guideway tube very small to minimize air leakage. A predetermined average lift cell height, preferably on the order of one-half to four inches, may be realized by choosing appropriate spring characteristics for load spring 54. Also, in this manner, a relatively large vertical and horizontal positional variation may be tolerated between carriage 14 and tubes 18A,18B for a relatively small air leakage gap.

Figure 7:
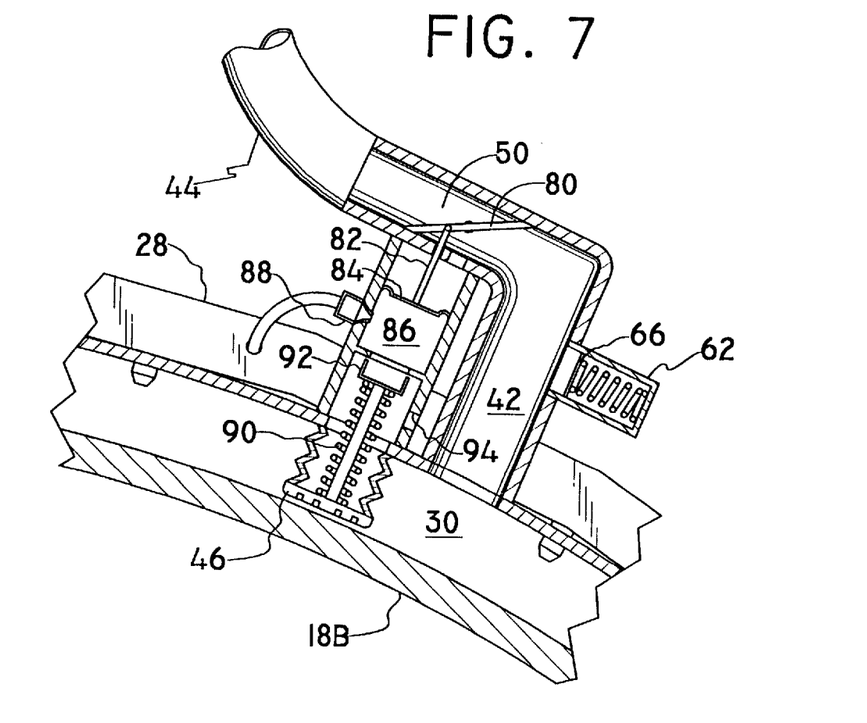
FIG. 7 is a sectional view showing a ram air valve and related structure associated with the lift cell shown in FIG. 5.

Attention is now directed primarily to FIG. 7 of the drawings. While a given carriage 14 is moving at high speeds, the lift cell height, and thus the lift cell volume, will fluctuate very rapidly as irregularities in the alignment of the guideway tubes 18A,18B are encountered. During a rapid rise in the surface of the guideway tube, the lift cell volume will quickly decrease; during a rapid fall in the surface of the guideway tube, the lift cell volume will quickly increase. While the cell skirts 32 are designed to accelerate with shoes 46 to follow the fluctuating contour of the guideway tube 18A,18B and will vent sufficient excess air during a rapid decrease in cell volume to maintain cell pressure, cell supply duct 28 and orifice valves 40 may be incapable of maintaining cell pressure in the event of a sudden increase in cell volume incident to a rapid fall of the guideway tube 18A, 18B away from the lift cell. Therefore, for minor lift cell height fluctuations of about ¼ inch or less which are short in duration, auxiliary vessel 42 provides an added volume of air interconnected with the lift cell volume to store energy in the form of compressed air when the cell volume is decreased relative to its average volume, with this energy being recovered during a rapid increase in the cell volume. The volume of auxiliary vessel 42 is made as large as practical to take advantage of air compressibility for providing a very rapid response rate as fluctuations are encountered. For intermediate fluctuations up to about an inch in the lift cell height, and for fluctuations of longer duration, an accumulator 62 is mounted to extend from auxiliary vessel 42 and includes a spring-loaded diaphragm 66 for storing displaced air from lift cell 30 and delivering it when needed. Finally, for more severe fluctuations in the lift cell height due to guideway irregularities, ram air is fed through ram air valve 50 and auxiliary vessel 42 to lift cell 30. Ram air valve 50 is responsive to the lift cell height to regulate the supply of ram air to lift cell 30 such that as the cell height decreases, more ram air is channeled to the lift cell. In the mechanical embodiment presently described, ram air valve 50 includes a valve member 80 coupled by a link 82 to a movable diaphragm 84 above high-pressure chamber 86. Chamber 86 is fed by air from cell supply duct 28 through a constant-flow orifice valve 88. A spring 90 connected to a cell height sensor shoe 46 forces a poppet valve 92 to restrict exhaust flow through the poppet valve to an exhaust port 94 as cell height decreases, thereby causing pressure in the chamber to rise proportionally to the decrease in cell height. As pressure within chamber 86 rises, diaphragm 84 is pushed upward, thereby causing valve member 80 to open further to permit more ram air to enter lift cell 30.

In an alternative to the mechanical embodiment described in the preceding two paragraphs, orifice valves 40 may be servo-controlled to instantaneously adjust air pressure within an associated lift cell in response to local cell height signals from cell height transducers 45, shown in FIG. 6, associated with shoes 46 and fixed to each lift cell to sense relative motion therebetween. Since shoes 46 are maintained at a substantially constant distance from the surface of guideway tube 18A,18B, each transducer 45 generates a signal representative of the lift cell height at the location of an associated shoe 46. Local cell height information may be processed and provided to electronically controlled orifice valves 40 to continuously adjust air flow from supply ducts 28 to lift cells 30 in response to localized loading changes. Likewise, ram air valve 50 may be servo-controlled to respond to changes in cell height, instead of or in addition to being mechanically linked to a shoe 46 as previously described. Cell height transducers 45 are further connected to provide a cell height signal to servo-actuators 47 for quickly accelerating skirts 32 toward or away from in response to instantaneous changes in lift cell height, thereby maintaining a minimal gap between the bottom of the skirt and the guideway tube.

Referring once again to FIG. 2, passenger car 16 is supported and tilted by air trapped between carriages 14 and passenger car floor 17. For lateral fluid sealing, each sidewall 19 of passenger car 16 includes an inflatable and flexible seal 74 extending the length thereof and arranged to slidably engage an opposing smoothly contoured side surface 24 of a carriage 14 to maintain continuous fluid-sealing engagement therewith, even when passenger car 16 pivots relative to carriage 14. For end sealing, pairs of left and right upstanding bulkhead plates 26A,26B at the front and rear ends of carriages 14 are arranged such that respective upper portions thereof are slidably received within corresponding left and right receptacle boxes 150A,150B opening upwardly through floor 17 and extending into the cabin of passenger car 16. Bulkhead plates 26A,26B are mounted on carriage 14 by sealed bearings 152A,152B for independent pivotal motion about an axis of an underlying guideway tube 18A,18B. Mating bulkheads 154 depend downwardly from floor 17 for slidable overlapping fit between each pair of bulkhead plates 26A,26B, such that a fluid seal is maintained under floor 17 at opposite ends of each carriage. The provision of receptacle boxes 150A,150B enables the center of gravity of passenger car 16 to be brought closer to guideway 12 for more stable travel, and decreases the profile area of the passenger car to lower air drag. Passenger car 16 is restricted to pivot about the axis of tube 18A or the axis of tube 18B at a given time. The representation in FIG. 3 shows the cooperation of carriage bulkhead plates 26A,26B with receptacle boxes 150A,150B and mating bulkhead 154 of passenger car 16 when the passenger car is pivoted about the axis of guideway tube 18B. It can be seen that left bulkhead plate 26A is removed from elevated receptacle box 150B, while right bulkhead plate 26B is forced to pivot about the axis of guideway tube 18B by engagement with displaced receptacle box 150B.

The volume between carriage 14 and floor 17 is preferably divided longitudinally into equally-sized left and right cushion zones 156A,156B by a flexible and collapsible partition 158 having a bottom lengthwise edge connected to carriage 14 by a hinge mechanism 160. Leftover air leaking from the lateral-most lift cells 30 at each guideway tube 18A,18B is prevented from escaping overboard by nearby servo-controlled end skirts 162, whereby the leftover air is redirected through supply ports 164 and into cushion zones 156A,156B. The primary source of car lifting and tilting air, however, is provided by remotely controlled auxiliary valves 168 communicating through collector duct 34, crossover ducts 33, and intake ducts 44 to divert air into cushion zones 156A,156B. When tilting of passenger car 16 is called for, a pressure differential may be established between the two cushion zones 156A,156B to cause or assist the desired tilt reaction.

Passenger car 16 is connected to each underlying carriage 14 by mechanical suspension means for adjusting the spacing between car floor 17 and the carriage. The suspension means serves to maintain the proper height of passenger car 16 in relation to other passenger cars in a multi-car train, and keep the floor 17 of the passenger car normal to the apparent gravity direction, under varying end-to-end and side-to-side loading conditions due to passengers taking different positions within the car. As described above, primary support for passenger car 16 is provided by air within cushion zones 156A,156B, which ensures a very smooth ride for passengers due to the low spring rate associated with the support air. In addition to this, the suspension means performs the functions described above without introducing unwanted rigidity so as not to transmit bumpy forces as carriage 14 encounters irregularities in the surface of guideway tubes 18A,18B.

In a preferred embodiment, the suspension means comprises a plurality of a variable length, shock absorbing servo-actuators 172 each including a bottom end pivotally mounted for rotation about the axis of hinge mechanism 160 and a top end fixed to the underside of passenger car floor 17. As shown in FIG. 1, a pair of actuators 172 may be associated with each carriage 14, one near a front section thereof and one near a rear section thereof. Servo-actuators 172 include means for generating a signal indicating the position of car floor 17 to servo-controlled end skirts 162, whereby skirts 162 either retain air for flow through supply ports 164 to cushion zones 156A,156B, or vent air overboard, as required to essentially maintain a condition of zero loading for the servo-actuator. Each servo-actuator 172, when de-activated, may be used in the "bottomed out" (retracted) position to assist in maintaining the passenger car 16 at a level and minimum height position in the event of unexpected loss of air pressure within cushion zones 156A, 156B, or during inactive periods when the passenger car is stationed for maintenance. Servo-actuators 172 may be any of a number of known devices, and most likely a pneumatic or closed hydraulic device.

A mechanical tilt actuator 174 is preferably provided as a secondary tilting system to the pressure driven tilting system described above. As shown in FIGS. 2 and 3, tilt actuator 174 may be in the form of an arcuate rack 176 engaged by a driven pinion 178 mounted on a fixed-length portion of servo-actuator 172 for rotation about the axis of hinge mechanism 160. As will be appreciated, as pinion 178 is displaced angularly toward a given side of rack 176, the floor 17 of passenger car 16 will rotate about the axis of a corresponding guideway tube 18A or 18B, and the length of servo-actuator 172 will adjust accordingly.

The vehicle system of the present invention is propelled and braked using air stored within one or both of guideway tubes 18A,18B. Guideway 12 includes a plurality of propulsion stations 200 located at regularly spaced intervals approximately twenty-five to fifty feet apart along the entire length of the guideway, one such propulsion station being shown in detail in FIGS. 7 and 8. Propulsion stations 200 are designed to interact with an inverted channel 204 arranged on the underside of each carriage 14 to extend the length thereof. More specifically, propulsion stations 200 selectively deliver thrust air to a series of directionally biased impulse vanes 208A in channel sidewall 206A, or to a series of oppositely biased impulse vanes 208B in channel sidewall 206B, depending upon the desired direction of thrust, in response to a remote signal generated by on-board signaling means.

Figure 8:
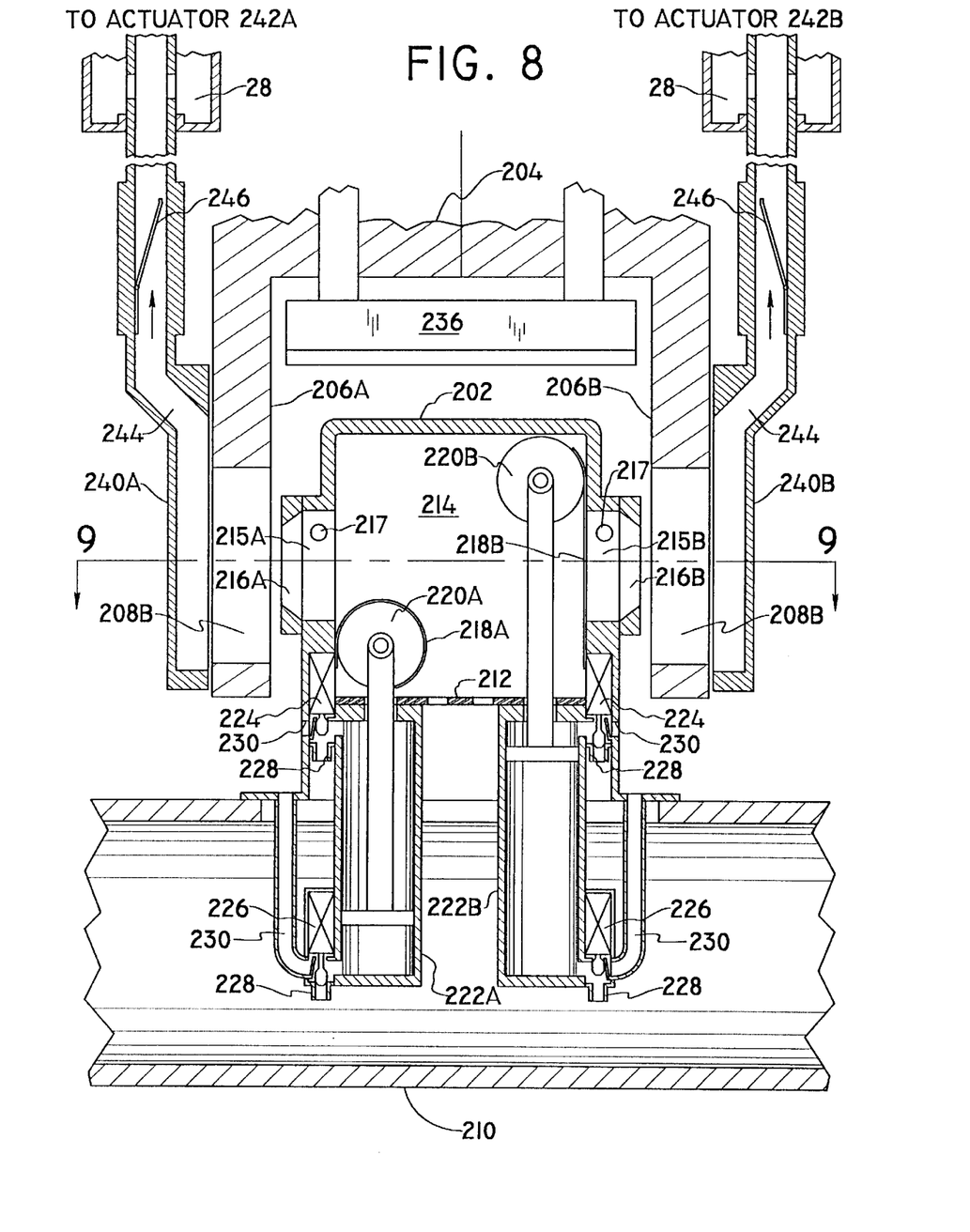
FIG. 8 is a front sectional view showing a propulsion station of the present invention.
Figure 9:
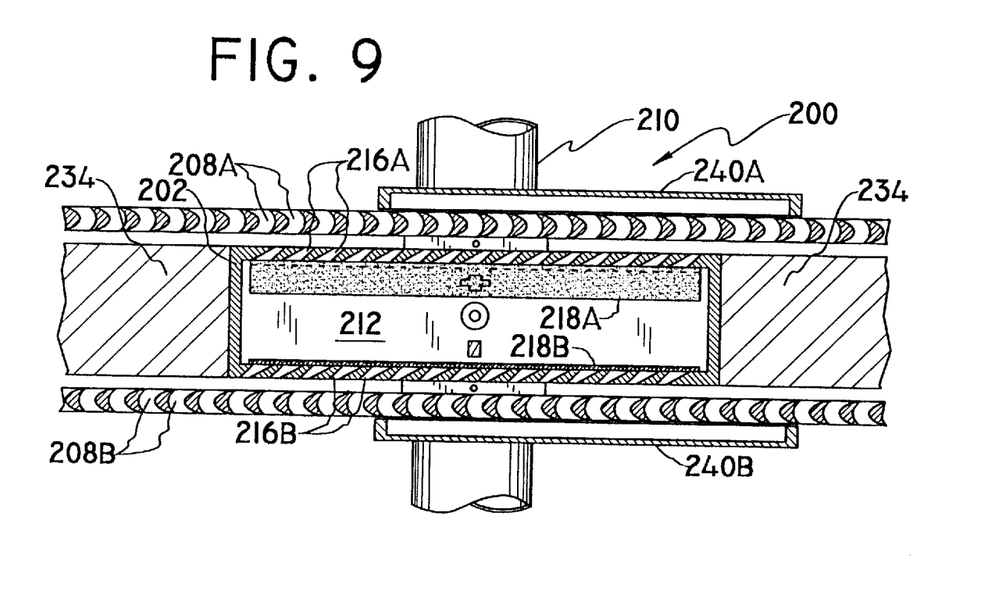
FIG. 9 is a view taken generally along the line 9—9 in FIG. 8.

Each propulsion station 200 includes a cross-tube 210 extending laterally between guideway tubes 18A and 18B, and a propulsion station manifold 202 mounted on the cross-tube intermediate the guideway tubes. The propulsion station 200 is designed to extract air from cross-tube 210, lower its pressure, and selectively guide the air through a chosen row of nozzle supply inlets 215A or 215B to a respective row of stationary thrust nozzles 216A or 216B complementary to opposing impulse vanes 208A or 208B in channel 204 on the underside of carriage 14. Thrust nozzles 216A,216B are configured such that the velocity of the air jet leaving each nozzle has a maximum direction component in the longitudinal direction of guideway 12, and only enough lateral velocity to bridge the distance between the nozzles and opposing impulse vanes 208A,208B. The use of air jets from stationary thrust nozzles 216A,216B located along guideway 12 impinging upon a series of carriage-mounted impulse vanes 208A, 208B, rather than a conventional on-board jet system, offers an efficiency advantage since the impulse vanes virtually reverse the jets' velocity direction to extract the jet energy in a single step. The velocity of the air jets leaving thrust nozzles 216A,216B is slightly more than twice the velocity of carriages 14 due to the low nozzle pressure selected. Since the jet direction is reversed by the moving impulse vanes 208A,208B, the final jet exhaust velocity is essentially zero, and virtually all of the jet energy has been transferred to carriage 14 in the form of thrust. In contrast, conventional propeller or jet propelled vehicles leave at least half of their expended energy behind in the residual motion of the jet or other reaction mass.

Thrust nozzles 216A and impulse vanes 208A are aligned in the opposite direction than thrust nozzles 216B and impulse vanes 208B, and are used for braking the train. Because the impulse vanes 208A are approaching the thrust nozzles 216A, rather than moving away from the nozzles, the braking thrust will be three times the propulsion thrust. Given the light weight of the vehicle, a smooth, controlled stop from a speed of 300 mph may be attained, limited only by passenger tolerance to deceleration. Passengers may comfortably tolerate a deceleration force of approximately one-fifth the force of gravity ($\frac{1}{5}$ G), which will stop the train in three miles, or $\frac{1}{3}$ G, which will stop the train in two miles. This distance is much shorter than normal weight trains would need to stop at this speed. Stopping distance is extremely important in determining the number of trains that can safely occupy a certain distance of guideway, and therefore the passenger carrying capacity of the train line.

The propulsion system of the present invention is designed to utilize low pressure air jets for efficient jet energy transfer, as described above, and to minimize noise effects on the environment. Accordingly, propulsion station manifold 202 houses a pressure reducing plate 212 for admitting air from cross-tube 210 into an upper exit chamber 214 maintained at 15 to 45 psi. Nozzle supply inlets 215A and 215B are normally blocked from communication with exit chamber 214 by a pair of thin metal sheets or peel valves 218A,218B each having an outer surface thereof coated with rubber for sealing the nozzle intakes, and a bottom end fixed to a wall of the exit chamber below the thrust nozzles. The sheets are carried on rollers 220A,220B linked to pneumatic cylinders 222A,222B, which act on the order of 100 milliseconds to either block or permit communication of a given set of thrust nozzles 216A or 216B with exit chamber 214. The rollers 220A,220B include means (not shown) for biasing each roller for rotational motion during retraction of the connected cylinder piston into a respective cylinder 222A,222B to re-roll the peel valve sheet attached thereto. Cylinders 222A,222B are each controlled by top and bottom two-way solenoid valves 224 and 226 each having a loading passageway 228 for receiving air from cross-tube 210 and a constantly venting passageway 230 for exhausting air to the atmosphere, depending upon the position of the solenoid valve. Solenoid valves 224 and 226 are preferably driven by pulse-width modulated (PWM) signals to vary the ratio of open time to closed time for a given row of nozzle supply inlets 215A or 215B in response to signals from pressure transducers 217 located at the nozzle supply inlets, whereby the nozzle pressure may be held at approximately 8 psi, or some other chosen pressure. For the depicted solenoids valves 224 and 226, one of the solenoid valves "loads" one end of the cylinder, while the other solenoid valve vents the other end of the cylinder to atmosphere, thereby determining the position of the piston, roller, and metal sheet. An electronic controller (not shown) reads the signal from pressure transducer 217 and signals the solenoid valves to position the rollers so as to maintain about 8 psi, or another chosen pressure, at the thrust nozzles. While air jets from thrust nozzles 216A,216B will be relatively quiet due to the low pressure used, sound baffles 219 are preferably provided on carriage 14 alongside sidewalls 206A,206B of inverted channel 204. It will be understood that solenoid valves 224 and 226 may be controlled remotely from the approaching train to allow fluid communication to a chosen set of thrust nozzles 216A or 216B at a chosen inlet pressure, thereby allowing the train operator to precisely control all braking and speed changes.

Carriages 14, and passenger car 16 carried thereby, are braked in part by switching from one set of thrust nozzles, for example thrust nozzles 216B, to the oppositely directed thrust nozzles 216A. Air flaps (not shown) provided at intervals along the length of the passenger car 16 also slow the train from high speeds. For emergency braking, a rigid beam 234 extends between adjacent propulsion station manifolds 202, and is frictionally engaged by an emergency skid brake 236 extending downwardly within inverted channel 204 if emergency braking becomes necessary.

The vehicle system of the present invention is designed for travel at speeds reaching 300 mph. As described previously, air for supporting the vehicle during travel at low speeds or while it is stationary is supplied through lift valves 36 in the guideway, and air for supporting the vehicle during high speed travel (i.e. greater than 150 mph) is supplied through ram air intakes 38. However, when the vehicle is traveling at intermediate speeds up to 150 mph, ram air pressure may be insufficient for supporting the carriages 14 and passenger car 16. To overcome this problem, there is preferably provided means for selectively trapping leftover propulsion jet air and diverting this air for use in supplying lift cells 30 and cushion zones 156A,156B. Pairs of jet caps 240A,240B in the bottom of carriages 14 are moveable vertically by cap actuators 242A,242B between a retracted position and an active position closely adjacent impulse vanes 208A,208B, as shown in FIG. 8, and may be stopped at any position between the fully retracted and active positions for progressive trapping of exhaust air as needed. Jet caps 240A,240B each include a passageway 244 opening in the direction of respective impulse vanes 208A,208B and communicating with cell supply ducts 28 by way of a flapper valve 246. It is contemplated to actuate jet caps only adjacent the impulse vanes 208B used in forward propulsion, except when the train is braking, thereby saving cost associated with providing excessive braking and propulsion air. The trapped jet air flows through cell supply ducts 28 to reach lift cells 30 and potentially cushion zones 156A,156B.

While the vehicle system heretofore described is designed for operating speeds of up to 300 mph, future design improvements may yield speeds far beyond this, subject to limitations imposed by guideway curvature dictated by terrain. Where long, straight guideways are permitted, future vehicles following this invention may attain supersonic speeds since the vehicle will not create a sonic boom in the manner of supersonic aircraft. The vehicle does not carry load bearing lifting surfaces nor stabilizing control surfaces, all of which generate powerful shock waves. As with high speed aircraft, all upper surfaces of the vehicle will be very smooth and at a very flat angle to the airflow. The frontal separation space between the lower edge of the leading carriage and the guideway is a potential noise source, and may be configured to be a supersonic air intake which will diffuse air to subsonic velocity and recover the ram pressure. This air may subsequently be delivered to ram air valves 50, or to rearwardly directed jet nozzles (not shown) so as to recover some of the thrust.

The top speed of the train may be incrementally increased by raising the pressure to thrust nozzles 216A,216B and using jet velocities in the low supersonic region. This will likely require additional sound suppression measures. The injection and combustion of hydrogen or other non-polluting fuel into the thrust nozzles will raise the jet temperature and jet velocity, thus increasing the vehicle velocity, without raising the jet Mach number and increasing jet noise. Fuel injection will be necessary for all higher vehicle speeds, both subsonic and supersonic, however this is relatively inexpensive to provide and requires only a small pipeline beneath guideway 12 and igniting injectors on the thrust nozzles. It does not require the carrying of combustible fuel on board, nor does it otherwise encumber the vehicle with extra weight.

What is claimed is:

1. A vehicle system comprising:

a guideway;

a carriage adapted for travel along said guideway, said carriage including a plurality of lift cells for containing pressurized air to levitate said carriage above said guideway; and a passenger car connected atop said carriage for pivotal motion relative thereto, said passenger car and said carriage defining a substantially fluid-sealed volume therebetween for containing pressurized air to support said passenger car;

wherein said pressurized air for levitating said carriage and said pressurized air for supporting said passenger car is supplied by pressurized air stored within said guideway and by ram air gathered as said passenger car travels along said guideway.

2. The vehicle system according to claim 1, wherein said guideway includes a plurality of stationary thrust nozzles supplied by said pressurized air stored within said guideway for selectively releasing commonly directed air jets, and said carriage includes a plurality of directionally biased impulse vanes arranged to receive impulse energy from said air jets to propel said carriage along said guideway.

3. The vehicle system according to claim 2, wherein said carriage includes jet cap means for selectively trapping air from said air jets and diverting said trapped air to said lift cells and said substantially fluid sealed volume.

4. The vehicle system according to claim 3, wherein said jet cap means is progessively movable between a retracted position and a fully active position for trapping air only as needed.

5. A vehicle system for transporting passengers along a guideway comprising:

a passenger car having a pair of transversely spaced sidewalls connected by a floor;

a carriage beneath said passenger car adapted for guided travel along said guideway, said passenger car being connected to said carriage for pivotal motion relative thereto;

bulkhead sealing means for substantially maintaining a fluid seal extending between said passenger car floor and said carriage at front and rear ends of said carriage;

said floor, carriage, pair of sidewalls, and bulkhead sealing means cooperating to define a substantially fluid-sealed volume beneath said floor; and pressure control means for increasing and decreasing air pressure within said fluid-sealed volume to support said passenger car in response to varying load distributions of said passenger car.

6. The vehicle system according to claim 5, wherein there are a plurality of said carriages in end-to-end relation beneath said passenger car.

7. The vehicle system according to claim 5, further including a flexible partition extending the length of said carriage between said front and rear bulkhead sealing means for dividing said fluid-sealed volume into left and right cushion zones, said partition having a bottom edge pivotally connected to said carriage by a hinge mechanism for rotation about an axis of said hinge mechanism and a top edge fixed to said passenger car floor, wherein said pressure control means establishes a pressure differential between said left and right cushion zones to adjust the pivot angle of said passenger car relative to said carriage.

8. The vehicle system according to claim 7, further including mechanical suspension means connecting said floor with said carriage for adjusting the spacing between said floor and said carriage.

9. The vehicle according to claim 7, further including mechanical actuating means for adjusting the pivot angle of said passenger car relative to said carriage.

10. The vehicle system according to claim 7, wherein said guideway stores pressurized air, and said carriage includes means for selectively supplying air from said guideway to said left and right cushion zones.

11. The vehicle system according to claim 10, wherein said means for selectively supplying air from said guideway to said left and right cushion zones includes a collector duct arranged to receive pressurized air from said guideway, and a plurality of remotely controlled auxiliary valves operative to transfer air from said collector duct to said left and right cushion zones.

12. The vehicle system according to claim 7, further including intake means for collecting ram air during motion of said passenger car and selectively introducing collected ram air to said left and right cushion zones.

13. A vehicle system comprising:

a guideway including a pair of parallel guideway tubes, at least one of said guideway tubes containing pressurized air and having a plurality of levitation valves spaced along the length thereof for selectively discharging air from said guideway tube;

a carriage adapted for travel along said guideway, said carriage including a first plurality of lift cells arranged circumferentially about a portion of one of said pair of guideway tubes and opening toward an outer surface of said one guideway tube, a second plurality of lift cells arranged circumferentially about a portion of another of said pair of guideway tubes and opening toward an outer surface of said another guideway tube, a collector duct arranged to receive air from said plurality of levitation valves, and supply duct means for transporting air from said collector duct to said first and second pluralities of lift cells to support said carriage above said guideway tubes on a cushion of air;

active skirt means defining the peripheral sides of each of said first and second pluralities of lift cells, said skirt means being adjustable in height to accommodate changes in lift cell height, and said skirt means having a bottom edge biased to remain in close proximity to said outer surface of said guideway tube associated therewith;

a passenger car connected to said carriage for travel therewith; and cell pressure control means for increasing and decreasing air pressure within said lift cells to support said carriage and said passenger car in response to varying load distributions of said carriage and said passenger car and surface variations in said guideway.

14. The vehicle system according to claim 13, wherein said carriage includes a plurality of independently movable shoes arranged opposite to an associated guideway tube, air jet means for maintaining an air gap between an underside of each of said plurality of shoes and said associated guideway tube, a plurality of load springs for biasing said shoes in the direction of said associated guideway tube, and bridge means connecting said plurality of shoes with said bottom edge of said skirt means.

15. The vehicle system according to claim 13, wherein said cell pressure control means includes a plurality of constant-flow orifice valves communicating from said supply duct means to said first and second pluralities of lift cells.

16. The vehicle system according to claim 13, wherein said cell pressure control means includes means for collecting ram air during motion of said passenger car and selectively introducing collected ram air to said first and second pluralities of lift cells.

17. The vehicle system according to claim 16, wherein said means for collecting ram air and selectively introducing collected ram air to said first and second pluralities of lift cells includes a plurality of ram air intakes in said passenger car, and a plurality of ram air valves in communication with said ram air intakes and with said first and second pluralities of lift cells, each of said ram air valves being responsive to the lift cell height of the lift cell with which it communicates such that ram air flow to said lift cell and air pressure within said lift cell are substantially inversely proportional to said lift cell height.

18. The vehicle system according to claim 13, wherein said guideway includes a plurality of propulsion stations at spaced intervals therealong communicating with said at least one guideway tube to receive pressurized air therefrom, each of said propulsion stations having a plurality of commonly-directed stationary thrust nozzles and means for selectively delivering jets of air through said plurality of thrust nozzles, and said carriage includes a plurality of directionally biased impulse vanes arranged to receive impulse energy from said air jets to propel said carriage along said guideway.

19. The vehicle system according to claim 18, wherein each of said plurality of propulsion stations includes a first plurality of said thrust nozzles commonly directed in a first guideway direction, and a second plurality of said thrust nozzles commonly directed in a second guideway direction opposite to said first guideway direction, and said carriage includes first and second pluralities of said impulse vanes respectively corresponding to said first and second pluralities of thrust nozzles.

20. The vehicle system according to claim 19, wherein said means for selectively delivering jets of air through a plurality of said thrust nozzles comprises a pair of pneumatically operated valves for opening and closing fluid communication to said first and second pluralities of thrust nozzles, respectively, to control nozzle inlet air pressure.

21. The vehicle system according to claim 20, wherein said inlet air pressure to said first and second pluralities of thrust nozzles is monitored by pressure transducer means, and said pneumatically operated peel valves are operated by top and bottom two-way solenoid valves connected for remote control signaling from on-board said vehicle and signaling from said pressure transducer means.

22. The vehicle system according to claim 21, wherein said solenoid valves are driven by modulated signals.

* * * * *